United States Patent
Lee et al.

(10) Patent No.: US 10,245,819 B2
(45) Date of Patent: Apr. 2, 2019

(54) SYSTEM AND METHOD FOR MANUFACTURING DISPLAY UNIT

(71) Applicant: LG CHEM, LTD., Seoul (KR)

(72) Inventors: Beom Seok Lee, Daejeon (KR); Hang Suk Choi, Daejeon (KR); Eung Jin Jang, Daejeon (KR); Suk Jae Lee, Daejeon (KR); Kyung Hyeok Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/617,280

(22) Filed: Jun. 8, 2017

(65) Prior Publication Data

US 2018/0009211 A1     Jan. 11, 2018

(30) Foreign Application Priority Data

Jul. 8, 2016    (KR) .................. 10-2016-0086607

(51) Int. Cl.
    *B32B 41/00*       (2006.01)
    *B32B 38/18*       (2006.01)
                  (Continued)

(52) U.S. Cl.
    CPC ............. *B32B 38/185* (2013.01); *B32B 7/06* (2013.01); *B32B 27/36* (2013.01); *B32B 37/02* (2013.01);
                  (Continued)

(58) Field of Classification Search
    CPC ......... B32B 38/185; B32B 7/06; B32B 37/02; B32B 38/10; B32B 37/182;
                  (Continued)

(56) References Cited

U.S. PATENT DOCUMENTS

| | | | |
|---|---|---|---|
| 2012/0211167 A1* | 8/2012 | Kimura | B32B 38/1841 156/379 |
| 2014/0085723 A1 | 3/2014 | Hada et al. | |
| 2018/0009211 A1 | 1/2018 | Lee et al. | |

FOREIGN PATENT DOCUMENTS

| | | |
|---|---|---|
| CN | 201637971 U | 11/2010 |
| CN | 103547962 A | 1/2014 |

(Continued)

*Primary Examiner* — Michael N Orlando
*Assistant Examiner* — Joshel Rivera
(74) *Attorney, Agent, or Firm* — Dentons US LLP

(57) ABSTRACT

A system for manufacturing a display unit according to an exemplary embodiment of the present invention includes: a carrying unit configured to carry an optical film including a polarizing film and a release film, wherein the polarizing film includes an adhesive layer through which, a release film adheres to and is peeled from the polarizing film; a cutting unit configured to cut the optical film up to a predetermined depth to form a polarizing film sheet piece on the optical film, without cutting the release film; a panel supply unit configured to continuously supply a panel to an attachment position, at which the polarizing film sheet piece is attached to one surface of the panel; an attachment unit configured to peel the polarizing film sheet piece from the release film, and attach the peeled polarizing film sheet piece to the one surface of the panel supplied by the panel supply unit; and a winding unit configured to wind the release film peeled by the attachment unit, wherein the attachment unit includes: an adhering means, which has an adhering property at an external side thereof, and peels the polarizing film sheet piece from the release film by the adhering property, and moves to the attachment position and makes the polarizing film sheet piece face the one surface of the panel in parallel; and an attaching means, which presses the adhering means to attaches the polarizing film sheet piece to the one surface of the panel.

16 Claims, 10 Drawing Sheets

(51) Int. Cl.
*B32B 7/06* (2019.01)
*B32B 27/36* (2006.01)
*B32B 37/02* (2006.01)
*B32B 37/18* (2006.01)
*B32B 38/00* (2006.01)
*B32B 38/10* (2006.01)

(52) U.S. Cl.
CPC ........ *B32B 37/182* (2013.01); *B32B 38/0004* (2013.01); *B32B 38/10* (2013.01); *B32B 2307/42* (2013.01); *B32B 2457/20* (2013.01)

(58) Field of Classification Search
CPC . B32B 38/0004; B32B 27/36; B32B 2457/20; B32B 2307/42
USPC ........................... 156/64, 350, 351, 378, 379
See application file for complete search history.

(56) References Cited

FOREIGN PATENT DOCUMENTS

| | | |
|---|---|---|
| CN | 104969281 A | 10/2015 |
| CN | 105339997 A | 2/2016 |
| CN | 105474293 A | 4/2016 |
| CN | 206975349 U | 2/2018 |
| JP | 2015206967 A | 11/2015 |

* cited by examiner

TRANSFERENCE DIRECTION OF
POLARIZING FILM SHEET PIECE

SYSTEM AND METHOD FOR MANUFACTURING DISPLAY UNIT

This application claims the priority to and benefit of KR 10-2016-0086607, filed on Jul. 8, 2016, which is incorporated by reference for all purposes as if fully set forth herein.

TECHNICAL FIELD

The present invention relates to a system and a method of manufacturing a display unit, and more particularly, to a system and a method of manufacturing a display unit, which suppress the generation of foreign substances during a process of peeling a polarizing film sheet piece from a releasing film.

BACKGROUND ART

A display unit including a liquid crystal display (LCD), an organic light emitting diode (OLED), a plasma display panel (PDP), and an electrophoretic display (EPD) is manufactured through several processes. In order to manufacture the display unit, a polarizing film formed with an absorption axis is attached to one surface and the other surface of a panel. A process of attaching the polarizing film to one surface of the panel will be described below.

In the process of attaching the polarizing film to one surface of the panel, when an optical film including a polarizing film including an adhesive layer and a release film, which is attached to the adhesive layer so as to be peeled from the adhesive layer, is supplied, the supplied optical film is carried to an attachment position, at which a polarizing film sheet piece is attached to the panel, by a carrying unit. Before the optical film is transferred to the attachment position, a plurality of arranged polarizing film sheet pieces is formed on the optical film by cutting the optical film by a predetermined depth, in which the release film is not cut. In the optical film, on which the polarizing film sheet pieces are formed, the polarizing film sheet pieces are peeled from the release film by a peeling unit, and the peeled polarizing film sheet pieces are attached to one surface of the panel by an attachment unit.

When the peeling unit in the related art is used, the release film is folded back toward an inner side at a front end of the peeling unit and a carrying direction of the release film is changed to peel the polarizing film sheet piece from the release film. However, by friction between the front end of the peeling unit and the release film, a surface of the release film is damaged and foreign substances are generated, and the generated foreign substances flow in during a process of attaching the polarizing film sheet pieces to one surface of the panel, thereby causing a defect of the display unit.

Korean Patent No. 10-0967499 (hereinafter, Patent Document 1) suggests a system for manufacturing an optical display unit and a carry mechanism. The Korean Patent discloses a characteristic in that an adhesive optical film may be peeled from a release film by using a peeling device and the peeled adhesive optical film may be bonded to a display substrate. However, the system for manufacturing the optical display unit disclosed in Patent Document 1 has difficulty in suppressing the generation of foreign substances in the peeling device and decreasing a defect of the optical display unit.

RELATED ART LITERATURE

Patent Document (Patent Document 1) Korean Patent No. 10-0967499

DETAILED DESCRIPTION OF THE INVENTION

Technical Problem

The technical object to be accomplished by the present invention is conceived to solve the problem, and is to provide a system and a method for manufacturing a display unit, which suppress the generation of foreign substances during a process of peeling a polarizing film sheet piece from a releasing film to decrease a defect of the display unit.

Technical Solution

An exemplary embodiment of the present invention provides a system for manufacturing a display unit, the system including: a carrying unit configured to carry an optical film including a polarizing film and a release film, wherein the polarizing film includes an adhesive layer through which, a release film adheres to and is peeled from the polarizing film; a cutting unit configured to cut the optical film up to a predetermined depth to form a polarizing film sheet piece on the optical film, without cutting the release film; a panel supply unit configured to continuously supply a panel to an attachment position, at which the polarizing film sheet piece is attached to one surface of the panel; an attachment unit configured to peel the polarizing film sheet piece from the release film, and attach the peeled polarizing film sheet piece to the one surface of the panel supplied by the panel supply unit; and a winding unit configured to wind the release film peeled by the attachment unit, wherein the attachment unit includes: an adhering means, which has an adhering property at an external side thereof, and peels the polarizing film sheet piece from the release film by the adhering property, and moves to the attachment position and makes the polarizing film sheet piece face the one surface of the panel in parallel; and an attaching means, which presses the adhering means to attaches the polarizing film sheet piece to the one surface of the panel.

The attachment unit may further include a moving means, which includes the adhering means in at least a part of a surface thereof, and moves so as to enable the adhering means to pass through an adhering position, at which the adhering means adheres to the carried polarizing film sheet piece, and the attachment position.

The moving means may be formed in a belt type and be rotated to enable the adhering means to circulate while passing through the adhering position and the attachment position.

Adhering force of the adhering means to the polarizing film sheet piece is larger than the adhering force between the adhesive layer of the polarizing film sheet piece and the release film and is smaller than the adhering force between the adhesive layer of the polarizing film sheet piece and the panel.

The attachment means may press a rear portion of the polarizing film sheet piece in a direction adjacent to the panel and attaches the rear portion of the polarizing film sheet piece to a rear portion of the panel, and moves forward to a front portion opposite to the rear portion of the polarizing film sheet piece to attach the polarizing film sheet piece to one surface of the panel.

The attachment means may include an attachment roll, and a diameter of the attachment roll may be 20 to 80 mm.

The system for manufacturing the display unit may further include an aligning unit, which aligns the panel to have a posture corresponding to a posture of the polarizing film sheet piece transferred to the attachment position.

The aligning unit may include: a photographing means, which photographs the polarizing film sheet piece and the panel transferred to the attachment position to provide an image; a control means, which calculates an alignment angle of the panel based on the image provided by the photographing means; and an adsorbing means, which adsorbs the panel and horizontally rotates or shifts the panel in a state corresponding to the alignment angle calculated by the control means.

The photographing means may simultaneously photograph the polarizing film sheet piece transferred to the attachment position and the panel supplied to the attachment position.

Another exemplary embodiment of the present invention provides a method of manufacturing a display unit, the method including: carrying an optical film wherein the optical film includes a polarizing film and a release film, wherein the polarizing film includes an adhesive layer through which, a release film adheres to and is peeled from the polarizing film, wherein the carrying is conducted by a carrying unit; cutting the optical film up to a predetermined depth to form a polarizing film sheet piece on the optical film, without cutting the release film, wherein the cutting is conducted by a cutting unit; continuously supplying a panel to an attachment position, at which the polarizing film sheet piece is attached to one surface of the panel, wherein the supplying is conducted by a panel supply unit; peeling the polarizing film sheet piece from the release film, and attaching the peeled polarizing film sheet piece to one surface of the panel supplied by the panel supply unit, wherein the peeling and attaching are conducted by an attachment unit; and winding the release film peeled by the attachment unit, wherein the winding is conducted by a winding unit, wherein the peeling and attaching includes: peeling the polarizing film sheet piece from the release film through an adhering means, wherein the adhering means has an adhering property at an external side thereof, moving the adhering means to the attachment position, and making the polarizing film sheet piece face one surface of the panel in parallel; and pressing the adhering means through an attachment means to attach the polarizing film sheet piece to one surface of the panel.

In the peeling and attaching, a moving means may make the adhering means pass through an adhering position, at which the adhering means adheres to the carried polarizing film sheet piece, and the attachment position, wherein at least a part of a surface of the moving means includes the adhering means.

In the peeling and attaching, the moving means may be formed in a belt type and is rotated, so that the adhering means circulates while passing through the adhering position and the attachment position.

Adhering force of the adhering means to the polarizing film sheet piece may be larger than the adhering force between the adhesive layer of the polarizing film sheet piece and the release film and may be smaller than the adhering force between the adhesive layer of the polarizing film sheet piece and the panel.

In the peeling and attaching, the attachment means may press a rear portion of the polarizing film sheet piece in a direction adjacent to the panel to attach the rear portion of the polarizing film sheet piece to a rear portion of the panel, and moves forward to a front portion opposite to the rear portion of the polarizing film sheet piece to attach the polarizing film sheet piece to one surface of the panel.

The attachment means may include an attachment roll, and a diameter of the attachment roll may be 20 to 80 mm.

The method may further include aligning the panel to have a posture corresponding to a posture of the polarizing film sheet piece transferred to the attachment position, wherein the aligning is conducted by an aligning unit.

The aligning may include: photographing the polarizing film sheet piece and the panel transferred to the attachment position and providing an image; calculating an alignment angle of the panel based on the image; and adsorbing the panel and horizontally rotating or shifting the panel to be a state corresponding to the alignment angle.

In the photographing, the polarizing film sheet piece transferred to the attachment position and the panel supplied to the attachment position may be simultaneously photographed.

Advantageous Effects

According to the exemplary embodiments of the present invention, it is possible to suppress the generation of foreign substances during a process of peeling the polarizing film sheet piece from the release film.

According to the exemplary embodiments of the present invention, it is possible to improve preciseness of the attachment of the polarizing film sheet piece to the panel.

BEST MODE

Figure 1:
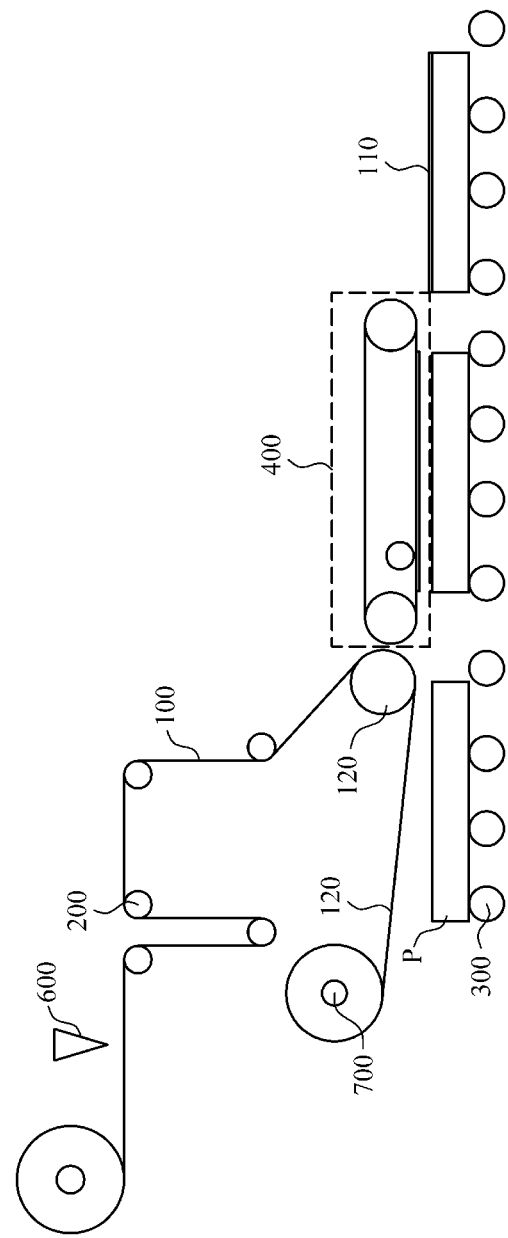
FIG. 1 is a diagram schematically illustrating a system for manufacturing a display unit according to an exemplary embodiment of the present invention.

Hereinafter, the exemplary embodiments of the present invention will be described more fully hereinafter with reference to the accompanying drawings so that those skilled in the art can easily carry out the present invention. However, the present invention may be modified in various different forms, are not limited to the exemplary embodiments described herein. A part irrelevant to the description will be omitted in the drawings to clearly describe the present invention, and the same elements will be designated by the same reference numerals throughout the specification.

Terms used in the present specification will be briefly described, and the present invention will be described in detail.

As the terms used in the present invention, general terms, which are currently and widely used in consideration of a function in the present invention, have been selected, but may be changed according to the intentions of those skilled in the art or judicial precedents, appearance of new technology, or the like. Further, in a specific case, there is a term randomly selected by an applicant, and in this case, a meaning of the term will be described in detail in the corresponding description of the invention. Accordingly, the terms used in the present invention shall be defined based on the meaning of the term and the contents throughout the present invention, not the simple name of the term.

Throughout the specification, unless explicitly described to the contrary, the word "comprise" and variations such as "comprises" or "comprising", will be understood to imply the inclusion of stated elements but not the exclusion of any other elements.

Hereinafter, the present invention will be described in detail with reference to the accompanying drawing.

FIG. 1 is a diagram schematically illustrating a system for manufacturing a display unit according to an exemplary embodiment of the present invention.

The system for manufacturing the display unit according to the exemplary embodiment of the present invention includes a carrying unit 200 carrying an optical film 100 including a polarizing film including an adhesive layer, and a release film 120, which adheres so that the polarizing film may be peeled through the adhesive layer, a cutting unit 600, which cuts the optical film 100 up to a predetermined depth, in which the release film 120 is not cut, and forms a polarizing film sheet piece 110 on the optical film 100, a panel supply unit 300, which continuously supplies a panel P to an attachment position, at which the polarizing film sheet piece 110 is attached to one surface of the panel P, an attachment unit 400, which peels the polarizing film sheet piece 110 from the release film 120, and attaches the peeled polarizing film sheet piece 110 to the one surface of the panel P supplied by the panel supply unit 300, and a winding unit 500, which winds the release film 120 peeled by the attachment unit 400, and the attachment unit 400 includes an adhering means 410, which has an adhering property at an external side thereof and peels the polarizing film sheet piece 110 from the release film 120 by the adhering property, and moves to the attachment position and makes the polarizing film sheet piece 110 face the one surface of the panel P in parallel, and an attaching means, which presses the adhering means 410 and attaches the polarizing film sheet piece 110 to the one surface of the panel P.

According to the exemplary embodiment of the present invention, it is possible to suppress the generation of foreign substances during a process of peeling the polarizing film sheet piece from the release film. Accordingly, it is possible to prevent foreign substances from flowing in during a process of attaching the polarizing film sheet piece to the one surface of the panel, thereby decreasing a defect of a manufactured display unit.

In the system for manufacturing the display unit according to the exemplary embodiment of the present invention, for example, the polarizing film 110 may be attached to the one surface of the panel P at a lower side of the panel P, and the polarizing film 110 may be attached to the other surface of the panel P at the lower side of the panel P by reversing the panel P, and the polarizing film 110 may be attached to the one surface of the panel P at an upper side of the panel P, and the polarizing film 110 may be attached to the other surface of the panel P at the upper side of the panel P by reversing the panel P.

Further, the polarizing film 110 may be attached to the one surface of the panel P at the upper side of the panel P, and the polarizing film 110 may be attached to the other surface of the panel P at the lower side of the panel P without reversing the panel P, and the polarizing film 110 may be attached to the one surface of the panel P at the lower side of the panel P, and the polarizing film 110 may be attached to the other surface of the panel P at the upper side of the panel P without reversing the panel P.

The processes of attaching the polarizing film sheet piece 110 to the one surface and the other surface of the panel P may be the same, so that for convenience of the description, the present invention will be described in detail based on the process of attaching the polarizing film sheet piece 110 to the one surface of the panel P hereinafter.

The optical film 100 used in the system for manufacturing the display unit according to the exemplary embodiment of the present invention includes the polarizing film, and may further include a film having an optical characteristic, such as a phase difference film, a viewing angle compensating film, and a luminance improving film, in addition to the polarizing film. That is, the optical film 100, in which a film having an optical characteristic is attached to one surface of both surfaces of the polarizing film, may be used. Further, the polarizing film may generally include a polarizer and a protective film formed on a single surface or both surfaces of the polarizer by glue or an adhesive.

A protective transparent film may be attached to the polarizing film and the film having the optical characteristic so as to protect the surfaces of the polarizing film and the film. For example, a triacetyl cellulose film and a polyethylenephthalate film may be used as the protective transparent film. An adhesive layer attachable to the panel P may be formed on one surface of the polarizing film, and the release film 120 for protecting the adhesive layer may be attached to the adhesive layer. For example, the adhesive layer may be formed of an acryl-based adhesive, a silicon-based adhesive, or a urethane-based adhesive, but the adhesive configuring the adhesive layer is not limited. A plastic-based film and the like may be used as the release film 120, and the release film 120 may also be coating-processed by a release agent based on silicon, long alkyl chain, fluorine, and molybdenum sulfide, but is not limited thereto. For example, a polyethylene terephthalate-based film and a polyolefin-based film may be used as the release film.

For example, the carrying unit 200 carries the optical film 100 including the polarizing film sheet piece 110 including the adhesive layer and the release film 120 attached to the adhesive layer so as to be peeled off to a downstream side of the system for manufacturing the display unit of the present invention. The carrying unit 200 may carry the optical film 100, which is attached to one surface of the panel P and has a width corresponding to a length of a short side of the panel P, or the optical film 100, which is attached to the other surface of the panel P and has a width corresponding to a length of a long side of the panel P.

The carrying unit 200 may include various delivering means which are capable of carrying the optical film 100.

For example, the carrying unit 200 may carry the optical film 100 by using a conveyor belt or a roller.

The system for manufacturing the display unit according to the exemplary embodiment of the present invention may use the optical film 100 in a roll type. When the roll-type optical film 100 is used, the system for manufacturing the display unit may include a cutting unit 600, which does not cut the release film 120, but cuts (hereinafter, half-cuts) the polarizing film and the adhesive layer with a predetermined interval, on the optical film 100 to form the polarizing film sheet piece 110 on the optical film 100.

The cutting unit 600 may sequentially half-cut the optical film 100 in a size corresponding to the panel P to form the polarizing film sheet piece 110 on the optical film 100. For example, the cutting unit 600 may sequentially half-cut the optical film 100, which is attached to one surface of the panel P and has a width corresponding to the length of the short side of the panel P, by an interval corresponding to the length of the long side of the panel P, and form the plurality of polarizing film sheet pieces 110 having a size corresponding to the panel P on the optical film 100. Further, the cutting unit 600 may sequentially half-cut the optical film 100, which is attached to the other surface of the panel P and has a width corresponding to the length of the long side of the panel P, by an interval corresponding to the length of the short side of the panel P, and form the plurality of polarizing film sheet pieces 110 having a size corresponding to the panel P on the optical film 100.

The cutting unit 600 may include various cutting means which are capable of cutting the optical film 100. For example, a laser device and a cutter may be used as the cutting unit.

Further, for example, the optical film 100, which is attached with the plurality of polarizing film sheet pieces 110 including the adhesive layer to the release film 120 and is wound in the roll type, may be used as the roll-type optical film 100. That is, the optical film 100 may be the optical film 100, which is half-cut, has a roll type, and is provided with the polarizing film sheet piece 110. Accordingly, when the roll-type optical film 100 is used, the process of cutting the optical film 100 and forming the polarizing film sheet pieces 110 may be omitted.

The carried optical film 100 may go through an examination process before being half-cut by the cutting unit 600. In the examination process, light may be emitted to the optical film 100 by using a light source, an image of transmissive light or reflective light emitted from the optical film 100 in the emitted light may be photographed, and the image may be processed to examine a defect on the optical film 100. For example, a method of detecting a defect through a light and shade determination by binarization processing may be used as the image processing method. A position, at which the optical film 100 needs to be half-cut, may be determined by using location information of the defect calculated by the examination process.

By using the location information of the defect of the optical film 100 calculated by the examination process, the cutting unit 600 may half-cut the optical film 100 so that the defect is not included in the polarizing film sheet piece 110 attached to the panel and form the polarizing film sheet piece 110. The polarizing film including the defect is not attached to the panel P and is excluded, so that it is possible to improve yield of the display unit and decrease a defect of the display unit.

The panel supply unit 300 continuously supplies the panel P to the attachment position, at which the polarizing film sheet piece 110 is attached to one surface of the panel P. The panel supply unit 300 may include various delivering means which are capable of carrying the panel P. For example, the panel supply unit 300 may carry the panel P by using a conveyor belt or a roller.

Before the panel P is supplied to the attachment position, the panel P may go through a cleaning process of removing foreign substances on a surface of the panel P.

Figure 2:
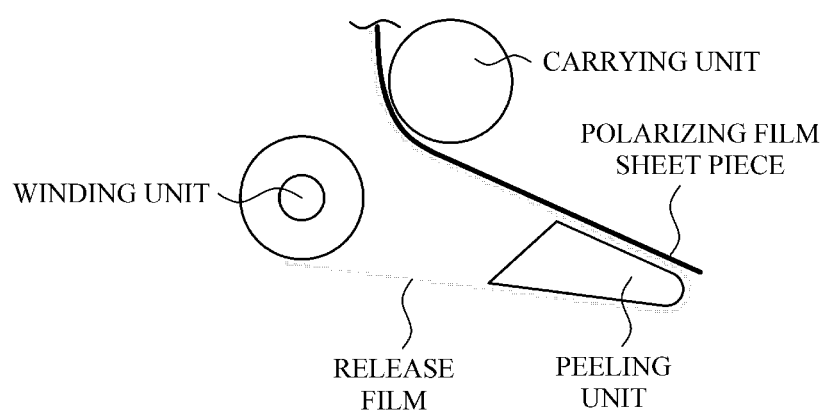
FIG. 2 is a diagram illustrating a case where a polarizing film sheet piece is peeled from a release film at a front end of a peeling unit.
Figure 3:
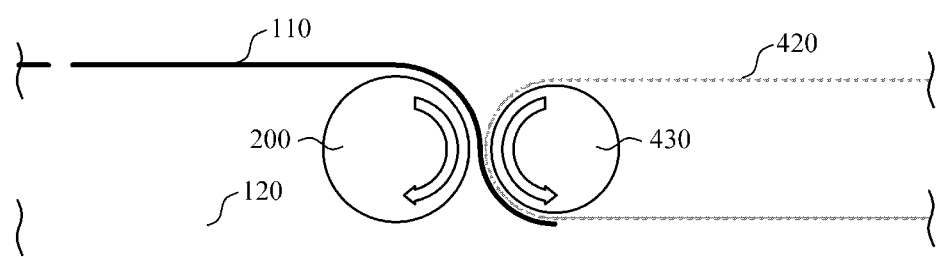
FIG. 3 is a diagram illustrating a case where a polarizing film sheet piece is peeled from a release film by an attachment unit according to an exemplary embodiment of the present invention.

FIG. 2 is a diagram illustrating a case where the polarizing film sheet piece is peeled from the release film at a front end of the peeling unit, and FIG. 3 is a diagram illustrating a case where the polarizing film sheet piece is peeled from the release film by the attachment unit according to the exemplary embodiment of the present invention.

According to the exemplary embodiment of the present invention, the attachment unit 400 peels the polarizing film sheet piece 110 from the release film 120, carries the peeled polarizing film sheet piece 110 to the attachment position, and attaches the polarizing film sheet piece 110 to one surface of the panel P supplied by the panel supply unit 300. The release film 120 peeled by the attachment unit 400 is wound by the winding unit 500.

The attachment unit 400 includes the adhering means 410 and the attachment means, and the adhering means 410 has an adhering property at an external side thereof, so that the adhering means 410 adheres to a surface of the polarizing film sheet piece 110 by the adhering property. The polarizing film sheet piece 110 adhering to the adhering means 410 is peeled from the release film 120, and the peeled polarizing film sheet piece 110 is moved to the attachment position in a state of adhering to the adhering means 410. At the attachment position, the polarizing film sheet piece 110 is positioned in a state of opposing one surface of the panel P supplied to the attachment position in parallel.

In the present invention, the term "parallel" is a substantially parallel state, and means that one surface of the panel P supplied to the attachment position faces one surface of the polarizing film sheet piece 110 transferred to the attachment position.

Referring to FIG. 2, when a separate peeling unit is used, the release film is folded back toward an inner side at a front end of the peeling unit and a carrying direction of the release film is changed to peel the polarizing film sheet piece from the release film. However, when the release film is folded back at the front end of the peeling unit and is peeled, foreign substances may be generated from a surface of the release film by friction between the release film and the front end of the peeling unit. The foreign substances generated during the peeling of the release film may flow into the polarizing film sheet piece, which is peeled from the release film and of which the adhesive layer is exposed, to cause a defect of the display unit.

However, as illustrated in FIG. 3, according to the exemplary embodiment of the present invention, the adhering means 410 may adhere to the surface of the polarizing film sheet piece 110, and may peel the polarizing film sheet piece 110 from the release film 120 by the adhering property without a separate peeling unit. Accordingly, it is possible to solve a problem in that foreign substances are generated in the surface of the release film by the friction between the front end of the peeling unit and the release film.

Further, according to the exemplary embodiment of the present invention, without requiring to apply predetermined tension to the release film in order to peel the release film from the polarizing film sheet piece by folding back the release film from the front end of the peeling unit, the polarizing film sheet piece 110 may be smoothly carried to the adhering means 410 from the release film 120 by the adhering property of the adhering means 410. Accordingly, it is possible to more stably peel the polarizing film sheet piece 110 from the release film 120.

Figure 4:
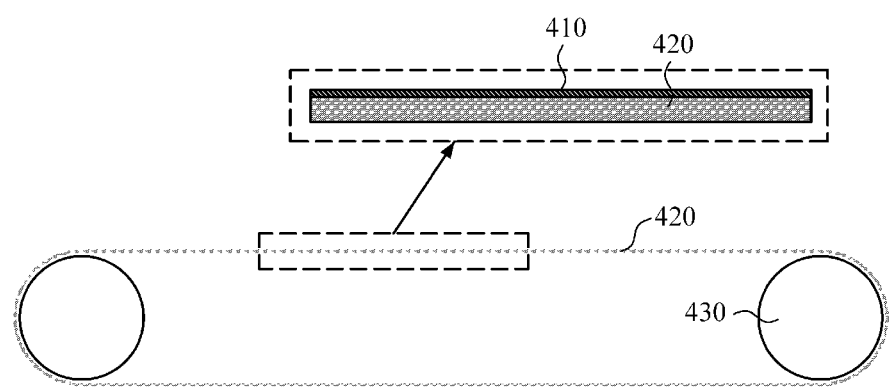
FIG. 4 is a diagram illustrating a moving means, which is formed with an adhering means on a surface thereof, according to an exemplary embodiment of the present invention.

FIG. 4 is a diagram illustrating a moving means, which is formed with the adhering means on a surface thereof, according to the exemplary embodiment of the present invention.

The attachment unit 400 according to the exemplary embodiment of the present invention may further include a moving means 420, which includes the adhering means 410 in at least a part of the surface thereof, and moves so as to enable the adhering means 410 to pass through an adhering position, at which the adhering means 410 may adhere to the carried polarizing film sheet piece 110, and the attachment position.

The adhering means 410 may be formed at an entire area or at a partial area of a surface of the moving means 420, but in order to decrease expenses for forming the adhering means 410 on the surface of the moving means 420 and expenses for maintaining and repairing the adhering means 410, the adhering means 410 may be formed at a predetermined area of the surface of the moving means 420. For example, the adhering means may be formed on the surface of the moving means at an interval corresponding to an interval of the rear portion, the middle portion, and the front portion of the carried polarizing film sheet piece so that the adhering means may adhere to a position of a rear portion, a middle portion, and a front portion of the polarizing film sheet piece.

Further, the adhering means 410 may be replaceably formed on the surface of the moving means 420. For example, when the adhering property of the adhering means 410 deteriorates which fail to smoothly peel the polarizing film sheet piece 110 from the release film 120, or the adhering means 410 is damaged, the adhering means 410 may be replaced with the new adhering means 410.

The moving means 420 may move the adhering means 410 to the adhering position and the attachment position. The adhering position is a position adjacent to the carried polarizing film sheet piece 110, and is a position, at which the adhering means 410 may adhere to the surface of the polarizing film sheet piece 110. The adhering means 410 is moved to the adhering position by the moving means 420 to adhere to the surface of the polarizing film sheet piece 110. The attachment position is a position, at which the polarizing film sheet piece 110 completely peeled from the release film 120 and carried and the panel P supplied by the panel supply unit 300 face, and is a position, at which the polarizing film sheet piece 110 is attached to one surface of the panel P.

The adhering means 410 may peel the polarizing film sheet piece 110 adhering to the adhering means 410 from the release film 120 while moving to the attachment position from the adhering position by the moving means 420. Referring to FIG. 3, when the adhering means 410 is moved to the adhering position and adheres to the surface of the polarizing film sheet piece 110, and then the carrying unit 200 carries the release film 120 and the polarizing film sheet piece 110 and simultaneously the moving means 420 moves the adhering means 410 to the attachment position from the adhering position, the polarizing film sheet piece 110 may be moved to the adhering means 410 while being peeled from the release film 120.

The attachment unit 400 may include a driver 430 for moving the moving means 420. The driver 430 may be formed of a publicly known means, and for example, the driver 430 may move the moving means 420 by using a motor to enable the adhering means 410 to pass through the adhering position and the attachment position.

The moving means 420 according to the exemplary embodiment of the present invention is formed in a belt type and is rotated to enable the adhering means 410 to circulate while passing through the adhering position and the attachment position.

The belt-type moving means 420 is rotated, so that the adhering means 410 formed on the surface of the moving means 420 is moved to the adhering position to adhere to the surface of the polarizing film sheet piece 110, the adhering means 410 peels the polarizing film sheet piece 110 from the release film 120 while moving from the adhering position to the attachment position, and the adhering means 410 carries the polarizing film sheet piece 110, which is completely peeled from the release film 120, to the attachment position. When the polarizing film sheet piece 110 transferred to the attachment position is completely attached to one surface of the panel P by the attaching means, the adhering means 410 moves to the adhering position again and adheres to the surface of the polarizing film sheet piece 110. That is, the belt-type moving means 420 is rotated, so that the adhering means 410 may repeatedly perform the process of peeling the polarizing film sheet piece 110 from the release film 120 and the process of carrying the polarizing film sheet piece 110 to the attachment position while circulating via the adhering position and the attachment position.

According to the exemplary embodiment of the present invention, adhering force of the adhering means 410 to the polarizing film sheet piece 110 may be larger than adhering force between the adhesive layer of the polarizing film sheet piece 110 and the release film 120 and may be smaller than adhering force between the adhesive layer of the polarizing film sheet piece 110 and the panel P.

The adhering means 410 may have the adhering property at the external side thereof and may adhere to the polarizing film sheet piece 110 by the adhering property. That is, the adhering means 410 may be attached to one surface of the polarizing film sheet piece 110 positioned at an opposite side of the release film 120 adhering to the polarizing film sheet piece 110. In order to effectively peel the polarizing film sheet piece 110 from the release film 120 through the adherence of the adhering means 410 to one surface of the polarizing film sheet piece 110, adhering force of the adhering means 410 to the polarizing film sheet piece 110 may be larger than the adhering force between the adhesive layer of the polarizing film sheet piece 110 and the release film 120.

Further, in order to effectively attach the polarizing film sheet piece 110 adhering to the adhering means 410 to one surface of the panel P, the adhering force of the adhering means 410 to the polarizing film sheet piece 110 may be smaller than the adhering force between the adhesive layer of the polarizing film sheet piece 110 and the panel P. That is, in order to simultaneously peel the polarizing film sheet piece 110 from the adhering means 410 moving to the attachment position and attach the polarizing film sheet piece 110 to one surface of the panel P, the adhering force between the adhesive layer of the polarizing film sheet piece 110 and the panel P may be larger than the adhering force of the adhering means 410 to the polarizing film sheet piece 110.

The adhering force of the adhesive layer included in the polarizing film sheet piece 110 may be different according to an adhering target. For example, the adhering force between the adhesive layer of the polarizing film sheet piece 110 and the release film 120 may be different from the adhering force between the adhesive layer of the polarizing film sheet piece 110 and the panel P, and the adhering force between the adhesive layer and the panel P may be larger than the adhering force between the adhesive layer and the release film 120.

Accordingly, the adhering property of the adhering means 410 may be formed to be larger than the adhering force between the adhesive layer of the polarizing film sheet piece 110 and the release film 120 in order to peel the polarizing film sheet piece 110 from the release film 120, and the adhering property of the adhering means 410 may be formed to be smaller than the adhering force between the adhesive layer of the polarizing film sheet piece 110 and the panel P in order to attach the polarizing film sheet piece 110 to one surface of the panel P.

The attachment unit 400 may include the adhering means 410, which is formed with an adhering agent at an external side thereof. When the adhering means 410 is moved to the adhering position, the adhering means 410 may peel the polarizing film sheet piece 110 from the release film 120 by the adhering property of the adhering agent, and carry the polarizing film sheet piece 110 to the attachment position. Further, the adhering agent may be formed in a predetermined area of the external side of the adhering means 410. For example, the adhering agent may be formed at the external side of the adhering means 410 at an interval corresponding to the interval of the rear portion, the middle portion, and the front portion of the carried polarizing film sheet piece 110 so that the adhering agent of the adhering means 410 may adhere to the positions of the rear portion, the middle portion, and the front portion of the polarizing film sheet piece 110.

Adhering force of the adhering agent formed at the external side of the adhering means 410 may be differently formed according to a portion of the adhering means 410. The adhering force of the adhering agent formed in the rear portion, the middle portion, and the front portion of the adhering means 410 is differently formed, so that it is possible to improve efficiency in adhesion of the adhering means 410 to the polarizing film sheet piece 110 and peeling the polarizing film sheet piece 110. For example, the adhering force of the adhering agent formed at the external side of the adhering means 410 may be formed to be increased from the rear portion to the front portion of the adhering means 410, and may be formed so that the rear portion and the front portion of the adhering means 410 have the same adhering force and the middle portion of the adhering means 410 has smaller adhering force than the rear portion and the front portion of the adhering means 410.

According to the exemplary embodiment of the present invention, the adhering means 410 may be formed with a plurality of holes, and a diameter of the hole may be 10 to 50 μm.

The adhering means 410 may be formed of a material having elasticity, for example, rubber or silicon. The plurality of holes having a diameter of a micro size may be formed in the adhering means 410, and a diameter of the hole may be 10 to 50 μm. For example, the plurality of holes including a hole having a diameter of 15 μm, a hole having a diameter of 25 μm, and a hole having a diameter of 40 μm may be regularly or randomly formed in the adhering means 410.

The hole may be formed in the adhering means 410 in a form, in which an upper side of the hole is formed at the external side of the adhering means 410 to be exposed to the outside, and a lower side of the hole is formed at the internal side of the adhering means 410 to be blocked.

The adhering means 410 may move to the adhering position and be in contact with the surface of the polarizing film sheet piece 110. When the adhering means 410 is in contact with the polarizing film sheet piece 110, the adhering means 410 receives a predetermined pressure in a direction of the polarizing film sheet piece 110. The adhering means 410 is compressed in the direction of the polarizing film sheet piece 110 by the pressure, and air inside the holes is discharged to the outside and internal sides of the holes may be in a state similar to a vacuum state at the compression moment of the adhering means 410. Negative pressure is generated in the direction of the adhering means 410 by an air pressure difference between the internal side of the hole, which is in the state similar to the vacuum state, and the outside of the hole, and the surface of the polarizing film sheet piece 110 may adhere to the adhering means 410 by the negative pressure.

In order to form the internal side of the hole to be in the state similar to the vacuum state and maintain the state, a liquid having predetermined viscosity may be applied to the external side of the adhering means 410.

For example, a micro pad may be used as the adhering means. The micro pad may be formed by sequentially laminating a release film, an adhering agent layer, a basic film, and an adsorbing layer. A thickness of the release film used in the micro pad may be 35 to 50 μm, a thickness of the adhering agent layer used in the micro pad may be 15 to 25 μm, a thickness of the basic film used in the micro pad may be 40 to 60 μm, and a thickness of the adsorbing layer used in the micro pad may be 100 to 300 μm. However, the thicknesses of the films configuring the micro pad are illustrative, and are not limited.

A plurality of holes having a micro size is formed on a surface of the adsorbing layer. When a predetermined pressure or more is applied to the adsorbing layer and the adsorbing layer is attached to a target, the plurality of micro holes adsorbs the target, so that the target may adhere to the micro pad.

A protective film may be attached onto an upper surface of the adsorbing layer of the micro pad. The protective film may protect the surface of the adsorbing layer during the carrying of the micro pad, and when the micro pad is used, the protective film may be peeled from the adsorbing layer. After the release film attached to a lower surface of the adhering agent layer s peeled, the micro pad may be attached to a surface of the moving means through the adhering agent layer.

Further, the micro pad may use, for example, the adsorbing layer, which has adsorption force of about 0.44 N/100 mm or more and a thickness of 100 μm, and the adsorbing layer, which has adsorption force of about 0.88 N/100 mm or more and a thickness of 300 μm. The adsorption force of the adsorbing layer may be adjusted by controlling the number of micro holes formed in the surface of the adsorbing layer.

The attachment means according to the exemplary embodiment of the present invention may include an attachment roll 440, and a diameter of the attachment roll 440 may be 20 to 80 mm. A diameter of the attachment roll 440 usable as the attachment means may be 20 to 80 mm. However, in order to improve performance of the attachment of the polarizing film sheet piece 110 to one surface of the panel P, a diameter of the attachment roll 440 may be 25 to 60 mm. However, the diameter of the attachment roll 440 is only illustrative, and is not limited.

Hereinafter, for convenience of the description, the present invention will be described in detail based on the case where the attachment roll is used as the attachment means.

Figure 5A:
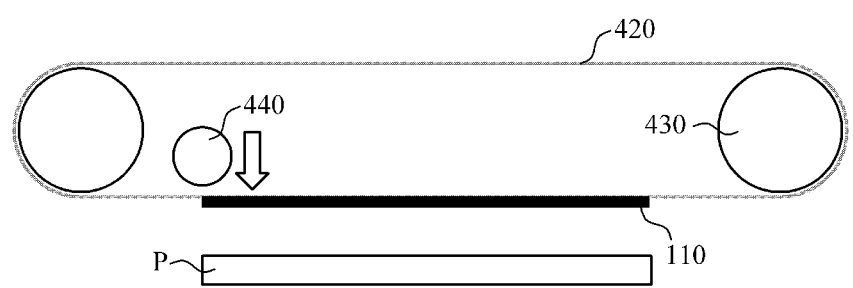
FIGS. 5A to 5C are diagrams illustrating a process of attaching the polarizing film sheet piece to one surface of a panel at an attachment position according to an exemplary embodiment of the present invention.
Figure 5B:
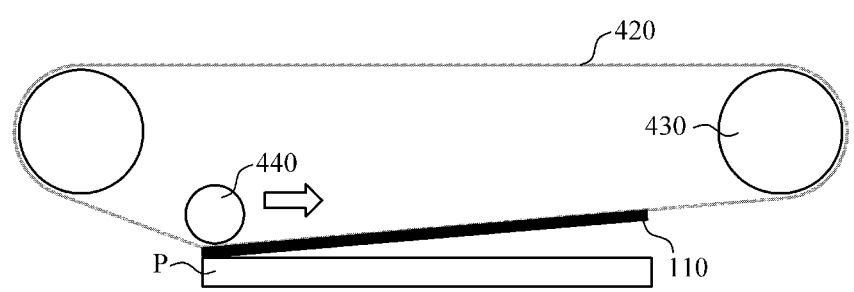
Figure 5C:
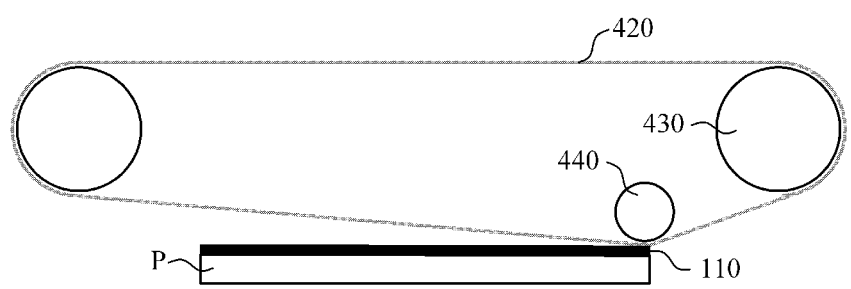

FIGS. 5A to 5C are diagrams illustrating a process of attaching the polarizing film sheet piece to one surface of the panel at the attachment position according to the exemplary embodiment of the present invention.

According to the exemplary embodiment of the present invention, when the polarizing film sheet piece 110, which is completely peeled from the release film 120 by the adhering means 410, is transferred to the attachment position, the attachment roll 440 presses the adhering means 410 and attaches the polarizing film sheet piece 110 adhering to the adhering means 410 to one surface of the panel P.

The attachment roll 440 may press the rear portion of the polarizing film sheet piece 110 in a direction adjacent to the panel P and attach the polarizing film sheet piece 110 to the rear portion of the panel P, and move forward in the direction of the front portion opposing the rear portion of the polarizing film sheet piece 110 to attach the polarizing film sheet piece 110 to one surface of the panel P.

FIG. 5A is a diagram illustrating the polarizing film sheet piece and the panel transferred to the attachment position. Referring to FIG. 5A, when the polarizing film sheet piece 110 and the panel P are transferred and the polarizing film sheet piece 110 and the panel P are arranged in parallel at the attachment position, the attachment roll 440 may move in a vertical direction in order to press the rear portion of the polarizing film sheet piece 110 in the direction adjacent to the panel P.

FIG. 5B is a diagram illustrating a process of attaching, by the attachment roll, the rear portion of the polarizing film sheet piece to the rear portion of the panel. Referring to FIG. 5B, when the attachment roll 440 moves in the vertical direction and attaches the rear portion of the polarizing film sheet piece 110 to the rear portion of the panel P, the attachment roll 440 may move forward in the direction of the front portion opposing the rear portion of the polarizing film sheet piece 110 in order to completely attach the polarizing film sheet piece 110 to the panel P.

FIG. 5C is a diagram illustrating the case where the attachment of the polarizing film sheet piece to one surface of the panel is completed. Referring to FIG. 5C, the attachment roll 440 moves forward from the rear portion of the polarizing film sheet piece 110 to the front portion of the polarizing film sheet piece 110, and presses the polarizing film sheet piece 110 and completely attaches the polarizing film sheet piece 110 to the panel P. The attachment roll 440, which attaches the polarizing film sheet piece 110 to one surface of the panel P, may vertically move in a direction of an opposite side of the panel P.

The attachment roll 440, which moves forward from the rear portion to the front portion of the polarizing film sheet piece 110 transferred to the attachment position, and attaches the polarizing film sheet piece 110 to one surface of the panel P, may vertically move in the direction of the opposite side of the panel P and stand by. Then, when a next polarizing film sheet piece 110 and a next panel P are transferred to the attachment position, the attachment roll 440 may press a front portion of the next polarizing film sheet piece 110 and attach the next polarizing film sheet piece 110 to a front portion of the next panel P, and may attach the next polarizing film sheet piece 110 to one surface of the next panel P while moving back from the front portion to a rear portion of the next polarizing film sheet piece 110.

Further, the attachment roll 440, which moves forward from the rear portion to the front portion of the polarizing film sheet piece 110 transferred to the attachment position, and attaches the polarizing film sheet piece 110 to one surface of the panel P, may vertically move in the direction of the opposite side of the panel P and be returned to an original position before attaching the polarizing film sheet piece 110. Next, when a next polarizing film sheet piece 110 and a next panel P are transferred to the attachment position, the attachment roll 440 may press a rear portion of the next polarizing film sheet piece 110 and attach the next polarizing film sheet piece 110 to a rear portion of the next panel P, and may attach the next polarizing film sheet piece 110 to one surface of the next panel P while moving forward from the rear portion to a front portion of the next polarizing film sheet piece 110.

Figure 6A:
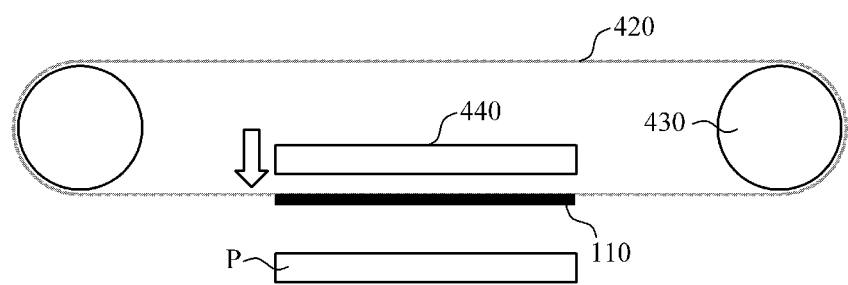
FIGS. 6A and 6B are diagrams illustrating a process of attaching the polarizing film sheet piece to one surface of the panel in a direction vertical to a direction of carrying of the polarizing film sheet piece according to an exemplary embodiment of the present invention.
Figure 6B:
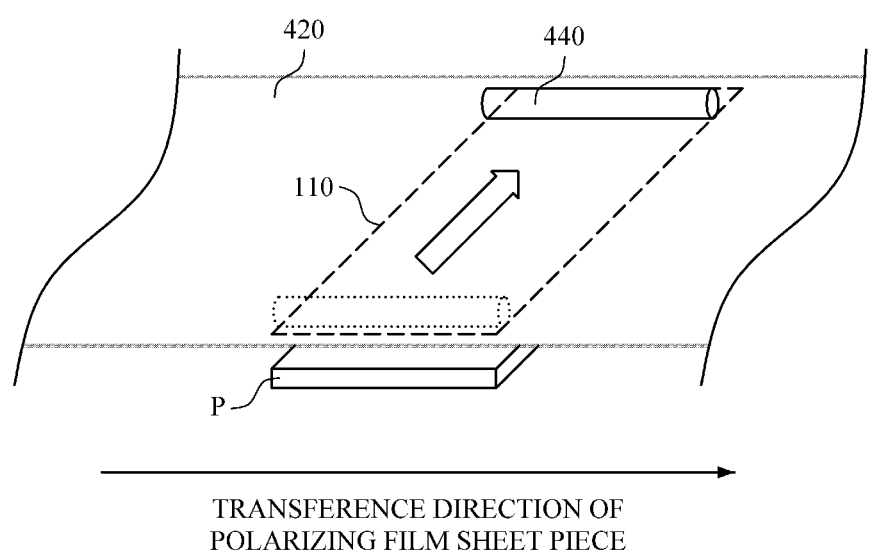

FIGS. 6A and 6B are diagrams illustrating a process of attaching the polarizing film sheet piece to one surface of the panel in a direction vertical to a direction of transference of the polarizing film sheet piece according to the exemplary embodiment of the present invention.

In order to manufacture the display unit, for example, the polarizing film sheet piece 110 having a width corresponding to a long side of the panel P may be attached to one surface of the panel P, and the polarizing film sheet piece 110 having a width corresponding to a short side of the panel P may be attached to the other surface of the panel P.

In order to manufacture the display unit having a screen size of, for example, 98 inches or more, a panel (hereinafter, a large-area panel) corresponding to the size of the display unit is used. The display unit may be manufactured by attaching the polarizing film sheet piece 110 having a width corresponding to a short side of a large-area panel to one surface of a large-area panel, and attaching the polarizing film sheet piece 110 having a width corresponding to a long side of the large-area panel to the other surface of the large-area panel. However, when the polarizing film sheet piece 110 having the width corresponding to the long side of the large-area panel is attached to the large-area panel in a longitudinal direction of the short side of the large-area panel, a width of the attachment roll 440, which attaches the polarizing film sheet piece 110 to the large-area panel, is increased, so that the attachment roll 440 may be drooped in a down direction. Accordingly, when the polarizing film sheet piece 110 is attached to the large-area panel, preciseness of the attachment of the polarizing film sheet piece 110 to the panel P is considerably degraded, and a defective factor is generated in an attachment surface of the polarizing film sheet piece 110 and the panel P, thereby degrading a quality of the display unit.

According to the exemplary embodiment of the present invention, the polarizing film sheet piece may be attached to one surface of the panel in the direction vertical to the transference direction of the polarizing film sheet piece.

Referring to FIGS. 5A to 5C, the attachment roll 440 may be formed so that a width direction of the attachment roll 440 is vertical to the transference direction of the polarizing film sheet piece 110, that is, the transference direction of the polarizing film sheet piece 110 to the attachment position by the adhering means 410. Accordingly, as described above, the attachment roll 440 may move forward in the transference direction of the polarizing film sheet piece 110 transferred to the attachment position to attach the polarizing film sheet piece 110 to one surface of the panel P.

In the meantime, referring to FIGS. 6A and 6B, the attachment roll 440 may be formed so that the width direction of the attachment roll 440 is parallel to the transference direction of the polarizing film sheet piece 110. That is, the attachment roll 440 may move in the direction vertical to the transference direction of the polarizing film sheet piece 110 transferred to the attachment position and may attach the polarizing film sheet piece 110 to one surface of the panel P. As illustrated in FIGS. 6A and 6B, the attachment roll 440 may press one end portion of the polarizing film sheet piece 110 parallel to the transference direction of the polarizing film sheet piece 110 transferred to the attachment position and attach the polarizing film sheet piece 110 to one end portion of the panel P. Then, the attachment roll 440 may move forward in a direction of the other end portion opposing the one end portion of the polarizing film sheet piece 110, that is, the direction vertical to the transference direction of the polarizing film sheet piece 110, to attach the polarizing film sheet piece 110 to one surface of the panel P.

In the case where the display unit is manufactured by attaching the polarizing film sheet piece to one surface of the large-area panel, when the large-area panel is transferred to the attachment position in the direction of the short side of the large-area panel, as illustrated in FIG. 6B, the attachment roll 440 may attach the polarizing film sheet piece 110 to one surface of the large-area panel while moving in the direction of the long side of the large-area panel.

Accordingly, according to the exemplary embodiment of the present invention, the polarizing film sheet piece 110 is attached in the direction of the long side of the large-area panel, so that it is possible to prevent preciseness of the attachment of the polarizing film sheet piece 110 to the panel P and the quality of the manufactured display unit from being degraded.

Figure 7:
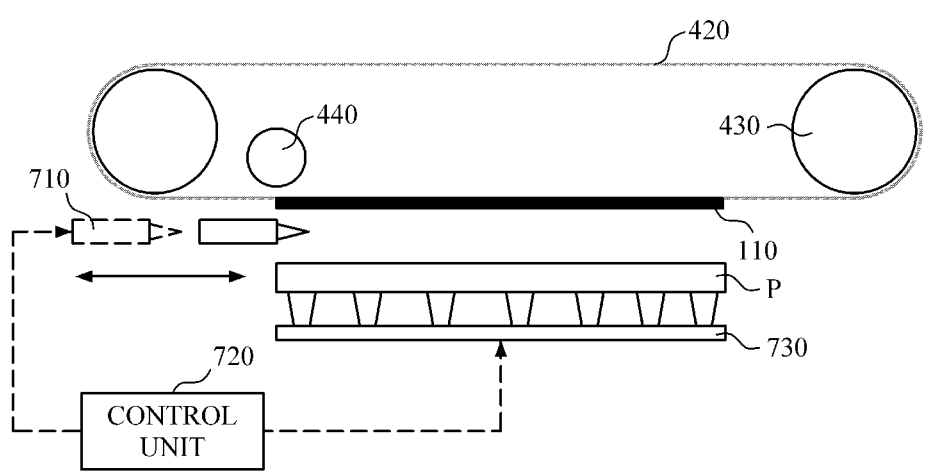
FIG. 7 is a diagram illustrating an aligning unit according to an exemplary embodiment of the present invention.

FIG. 7 is a diagram illustrating an aligning unit according to the exemplary embodiment of the present invention.

The system for manufacturing the display unit according to the exemplary embodiment of the present invention may further include an aligning unit, which aligns the panel P to have a posture corresponding to a posture of the polarizing film sheet piece 110 transferred to the attachment position.

The aligning unit may include a photographing means 710, which photographs the polarizing film sheet piece 110 and the panel P transferred to the attachment position and provides an image, a control means 720, which calculates an alignment angle of the panel P by using the image provided by the photographing means 710, and an adsorbing means 730, which adsorbs the panel P and rotates or shifts the panel P in a horizontal state in a state corresponding to the alignment angle calculated by the control means 720 to align the posture of the panel P to be a posture corresponding to the posture of the polarizing film sheet piece 110 transferred to the attachment position.

According to the exemplary embodiment of the present invention, immediately before the polarizing film sheet piece is attached to one surface of the panel, the panel is aligned to have a posture corresponding to the posture of the polarizing film sheet piece transferred to the attachment position, thereby improving preciseness of the attachment of the polarizing film sheet piece to the panel.

The control means 720 may be linked with the photographing means 710 and the adsorbing means 730, and may control the photographing means 710 and the adsorbing means 730. The control means 720 may shift forward the photographing means 710 to a position, at which the polarizing film sheet piece 110 and the panel P transferred to the attachment position may be photographed, and when the photographing is completed, the control means 710 may shift back and return the photographing means 710 to an original position. Further, the control means 720 may rotate or shift the panel P in the horizontal state by controlling the adsorbing means 730 to align the posture of the panel P to correspond to the alignment angle calculated by the control means 720.

The plurality of photographing means 710 may be formed, and may photograph both edges of the rear portions of the panel P and the polarizing film sheet piece 110 or photograph both edges of the front portions of the panel P and the polarizing film sheet piece 110. Further, the photographing means 710 may photograph the rear portions of the panel P and the polarizing film sheet piece 110 or the front portions of the panel P and the polarizing film sheet piece 110. Image information of the panel P and the polarizing film sheet piece 110 photographed by the photographing means 710 may be transmitted to and stored in the control means 720.

The control means 720 may calculate an alignment angle for aligning the panel P transferred to the attachment position to have the posture corresponding to the posture of the polarizing film sheet piece 110 by using the image information of the polarizing film sheet piece 110 and the panel P photographed by the photographing means 710. Information on the alignment angle calculated by the control means 720 may be transmitted to the adsorbing means 730.

The adsorbing means 730 adsorbs the panel P, and rotates or shifts the panel P in the horizontal state and aligns the posture of the panel P to correspond to the posture of the polarizing film sheet piece 110 transferred to the attachment position by using the information on the alignment angle transmitted from the control means 720.

According to the exemplary embodiment of the present invention, in contrast to the method of aligning the panel to have the posture corresponding to the posture of the polarizing film sheet piece and then suppling the panel to the attachment position, the panel supplied to the attachment position may be aligned to correspond to the posture of the polarizing film sheet piece transferred to the attachment position. That is, after the posture of the panel is aligned at the attachment position, the polarizing film sheet piece and the panel may be immediately attached. Accordingly, it is possible to remove an attachment error generated due to a distortion of the posture of the aligned panel during the process of supplying the posture-aligned panel to the attachment position, and decrease an error of the attachment of the polarizing film sheet piece to the panel to less than 100 μm.

The photographing means 710 according to the exemplary embodiment of the present invention may simultaneously photograph the polarizing film sheet piece 110 transferred to the attachment position and the panel P supplied to the attachment position.

The number of photographing means 710, which is capable of photographing the panel P, may be two or more. For example, the polarizing film sheet piece 110 transferred to the attachment position and the panel P supplied to the attachment position may be simultaneously photographed through the photographing means 710 photographing the polarizing film sheet piece 110 transferred to the attachment position and the photographing means 710 photographing the panel P supplied to the attachment position. Further, the polarizing film sheet piece 110 transferred to the attachment position and the panel P supplied to the attachment position may be simultaneously photographed through the single photographing means 710. For example, the polarizing film sheet piece 110 transferred to the attachment position and the panel P supplied to the attachment position may be simultaneously photographed by using the photographing means 710 formed with dual lenses, or by forming a device, which is capable of expanding a photographing angle in a lens of the photographing means 710.

The display unit manufactured by attaching the polarizing film sheet piece 110 to one surface and the other surface of the panel P may be transferred by a transferring unit. For example, a carrying roller or a conveyor belt may be used as the transferring unit.

A method of manufacturing a display unit according to another exemplary embodiment of the present invention includes a carrying operation of carrying, by a carrying unit 200, an optical film 100, which includes a polarizing film including an adhesive layer, and a release film 120 adhering so that the polarizing film may be peeled through the adhesive layer, a sheet piece forming operation of cutting the optical film 100 up to a predetermined depth, in which the release film 120 is not cut, by using a cutting unit 600 and forming a polarizing film sheet piece 110 on the optical film 100, a panel supply operation of continuously supplying, by a panel supply unit 300, a panel P to an attachment position, at which the polarizing film sheet piece 110 is attached to one surface of the panel P, an attaching operation of peeling the polarizing film sheet piece 110 from the release film 120 by using an attachment unit 400, and attaching the peeled polarizing film sheet piece 110 to one surface of the panel P supplied by the panel supply unit 300, and a winding operation of winding the release film 120 peeled by the attachment unit 400 by using a winding unit 500, and the attaching operation includes an operation of peeling, by an adhering means 410 having an adhering property at an external side thereof, the polarizing film sheet piece 110 from the release film 120, moving the polarizing film sheet piece 110 to the attachment position, and making the polarizing film sheet piece 110 face one surface of the panel P in parallel, and an operation of pressing the adhering means 410 through an attachment means and attaching the polarizing film sheet piece 110 to one surface of the panel P.

According to another exemplary embodiment of the present invention, there is provided the method of manufacturing the display unit, in which the generation of foreign substances is suppressed in the operation of peeling the polarizing film sheet piece from the release film, thereby decreasing a defect of the manufactured display unit.

A process of attaching the polarizing film sheet piece 110 to the other surface of the panel P may be performed in the same manner as that of the process of attaching the polarizing film sheet piece 110 to one surface of the panel P, so that hereinafter, for convenience of the description, the present invention will be described in detail based on the process of attaching the polarizing film sheet piece 110 to one surface of the panel P.

In the process of attaching the polarizing film sheet piece 110 to one surface of the panel P according to another exemplary embodiment of the present invention, the optical film 100, which includes the polarizing film including the adhesive layer, and the release film 120 adhering so that the polarizing film may be peeled through the adhesive layer, is supplied, and the panel P is supplied to the attachment position, at which the polarizing film sheet piece 110 is attached to one surface of the panel P. The supplied optical film 100 is unwound and carried, and the optical film 100 is cut by the predetermined depth, in which the release film 120 on the carried optical film 100 is not cut, by using the cutting unit 600, and forms the polarizing film sheet piece 110 on the optical film 100. Then, the polarizing film sheet piece 110 is peeled from the release film 120 by using the attachment unit 400, and the polarizing film sheet piece 110 completely peeled from the release film 120 is transferred to the attachment position. The polarizing film sheet piece 110 transferred to the attachment position is attached to one surface of the panel P supplied to the attachment position.

In the attaching operation according to another exemplary embodiment of the present invention, the adhering means 410 may pass through an adhering position, at which the adhering means 410 may adhere to the carried polarizing film sheet piece 110, and the attachment position by a moving means 420, which includes the adhering means 410 in at least a part of a surface thereof.

In the attaching operation, the adhering means 410 may be shifted via the adhering position and the attachment position by the moving means 420. The adhering means 410 may adhere to the polarizing film sheet piece 110 at the adhering position, and the polarizing film sheet piece 110 may be peeled from the release film 120 while the adhering means 410 is shifted from the adhering position to the attachment position. The polarizing film sheet piece 110 adhering to the adhering means 410 may be transferred to the attachment position together with the adhering means 410.

In the attaching operation according to the another exemplary embodiment of the present invention, the moving means 420 may be formed in a belt form and is rotated, so that the adhering means 410 may circulate while passing through the adhering position and the attachment position. The belt-type moving means 420 is rotated, so that the adhering means 410 may repeatedly perform the process of peeling the polarizing film sheet piece 110 from the release film 120 and the process of transferring the polarizing film sheet piece 110 to the attachment position while circulating via the adhering position and the attachment position.

According to the another exemplary embodiment of the present invention, adhering force of the adhering means to the polarizing film sheet piece may be larger than adhering force between the adhesive layer of the polarizing film sheet piece and the release film, and may be smaller than adhering force between the adhesive layer of the polarizing film sheet piece and the panel.

The adhering property of the adhering means 410 may be formed to be larger than the adhering force between the adhesive layer of the polarizing film sheet piece 110 and the release film 120 in order to peel the polarizing film sheet piece 110 from the release film 120, and the adhering property of the adhering means 410 may be formed to be smaller than the adhering force between the adhesive layer of the polarizing film sheet piece 110 and the panel P in order to attach the polarizing film sheet piece 110 to one surface of the panel P.

In the attaching operation according to another exemplary embodiment of the present invention, the attachment means may press a rear portion of the polarizing film sheet piece 110 in a direction adjacent to the panel P and attach the polarizing film sheet piece 110 to a rear portion of the panel P, and move forward in a direction of a front portion opposing the rear portion of the polarizing film sheet piece 110 to attach the polarizing film sheet piece 110 to one surface of the panel P.

In the attaching operation, when the polarizing film sheet piece 110 and the panel P are transferred to the attachment position, the attachment means vertically moves and presses the rear portion of the polarizing film sheet piece 110 in the direction adjacent to the panel P and attaches the polarizing film sheet piece 110 to one surface of the panel P. The attachment means, which attaches the rear portion of the polarizing film sheet piece 110 to the rear portion of the panel P, may move forward in a direction of a front portion of the polarizing film sheet piece 110 opposing the rear portion of the polarizing film sheet piece 110 and completely attach the polarizing film sheet piece 110 to the panel P.

The attachment means according to another exemplary embodiment of the present invention may include an attachment roll 440, and a diameter of the attachment roll 440 may be 20 to 80 mm. In order to manufacture the display unit having an excellent quality, attachment performance of the polarizing film sheet piece 110 to the panel P may be improved by using the attachment roll 440 having a diameter of 25 to 60 mm.

The method of manufacturing the display unit according to another exemplary embodiment of the present invention may further include an aligning operation of aligning the panel P to have a posture corresponding to a posture of the polarizing film sheet piece 110 transferred to the attachment position by using an aligning unit.

The aligning operation may include an operation of photographing, by a photographing means 710, the polarizing film sheet piece 110 and the panel P transferred to the attachment position and providing an image, an operation of calculating, by a control means 720, an alignment angle of the panel P by using the image provided by the photographing means 710, and an operation of adsorbing, by an adsorbing means 730, the panel P and rotating or shifting the panel P in a horizontal state to be a state corresponding to the alignment angle calculated by the control means 720 and aligning the posture of the panel P to be a posture corresponding to the posture of the polarizing film sheet piece 110 transferred to the attachment position.

According to another exemplary embodiment of the present invention, the posture of the panel supplied to the attachment position is aligned so as to correspond to the posture of the polarizing film sheet piece transferred to the attachment position, thereby improving preciseness of the attachment of the polarizing film sheet piece to the panel. Accordingly, it is possible to improve a quality of the manufactured display unit.

The photographing means 710 according to another exemplary embodiment of the present invention may simultaneously photograph the polarizing film sheet piece 110 transferred to the attachment position and the panel P supplied to the attachment position.

The above description of the present invention is illustrative, and those skilled in the art to which the present invention pertains may understand that modifications to other particular forms may be easily made without changing the technical spirit or the essential feature of the present invention. Thus, it is to be appreciated that embodiments described above are intended to be illustrative in every sense, and not restrictive. For example, each constituent element described in a singular form may be distributed and carried out, and similarly, constituent elements described in a distributed form may be carried out in a combination form.

The scope of the present invention is represented by the claims to be described below rather than the detailed description, and it is to be interpreted that the meaning and scope of the claims and all the changes or modified forms derived from the equivalents thereof come within the scope of the present invention.

EXPLANATION OF REFERENCE NUMERALS AND SYMBOLS

100: Optical film
110: Polarizing film sheet piece
120: Release film
200: Carrying unit
300: Panel supply unit
400: Attachment unit
410: Adhering means
420: Moving means
430: Driver
440: Attachment roll
500: Winding unit
600: Cutting unit
710: Photographing means
720: Control means
730: Adsorbing means

The invention claimed is:

1. A system for manufacturing a display unit, the system comprising:
a carrying unit configured to carry an optical film including a polarizing film and a release film, wherein the polarizing film includes an adhesive layer through which, a release film adheres to and is peeled from the polarizing film;
a cutting unit configured to cut the optical film up to a predetermined depth to form a polarizing film sheet piece on the optical film, without cutting the release film;
a panel supply unit configured to continuously supply a panel to an attachment position, at which the polarizing film sheet piece is attached to one surface of the panel;
an attachment unit configured to peel the polarizing film sheet piece from the release film, and attach the peeled polarizing film sheet piece to the one surface of the panel supplied by the panel supply unit; and
a winding unit configured to wind the release film peeled by the attachment unit,
wherein the attachment unit includes:
an adhering means, which has an adhering property at an external side thereof, and peels the polarizing film sheet piece from the release film by the adhering property, and moves to the attachment position and makes the polarizing film sheet piece face the one surface of the panel in parallel;
an attaching means, which presses the adhering means to attach the polarizing film sheet piece to the one surface of the panel, and
a moving means, which moves so as to enable the adhering means to pass through an adhering position, at which the adhering means adheres to the carried polarizing film sheet piece, and the attachment position, and
wherein the adhering means is positioned on at least a part of a surface of the moving means.

2. The system of claim 1, wherein the moving means is formed in a belt type and is rotated to enable the adhering means to circulate while passing through the adhering position and the attachment position.

3. The system of claim 1, wherein adhering force of the adhering means to the polarizing film sheet piece is larger than the adhering force between the adhesive layer of the polarizing film sheet piece and the release film and is smaller than the adhering force between the adhesive layer of the polarizing film sheet piece and the panel.

4. The system of claim 1, wherein the attachment means presses a rear portion of the polarizing film sheet piece in a direction adjacent to the panel and attaches the rear portion of the polarizing film sheet piece to a rear portion of the panel, and moves forward to a front portion opposite to the rear portion of the polarizing film sheet piece to attach the polarizing film sheet piece to one surface of the panel.

5. The system of claim 1, wherein the attachment means includes an attachment roll, and
a diameter of the attachment roll is 20 to 80 mm.

6. The system of claim 1, further comprising:
an aligning unit, which aligns the panel to have a posture corresponding to a posture of the polarizing film sheet piece transferred to the attachment position.

7. The system of claim 6, wherein the aligning unit includes:
a photographing means, which photographs the polarizing film sheet piece and the panel transferred to the attachment position to provide an image;
a control means, which calculates an alignment angle of the panel based on the image provided by the photographing means; and
an adsorbing means, which adsorbs the panel and horizontally rotates or shifts the panel in a state corresponding to the alignment angle calculated by the control means.

8. The system of claim 7, wherein the photographing means simultaneously photographs the polarizing film sheet piece transferred to the attachment position and the panel supplied to the attachment position.

9. A method of manufacturing a display unit, the method comprising:
carrying an optical film wherein the optical film includes a polarizing film and a release film, wherein the polarizing film includes an adhesive layer through which, a release film adheres to and is peeled from the polarizing film, wherein the carrying is conducted by a carrying unit;
cutting the optical film up to a predetermined depth to form a polarizing film sheet piece on the optical film, without cutting the release film, wherein the cutting is conducted by a cutting unit;
continuously supplying a panel to an attachment position, at which the polarizing film sheet piece is attached to one surface of the panel, wherein the supplying is conducted by a panel supply unit;
peeling the polarizing film sheet piece from the release film, and attaching the peeled polarizing film sheet piece to one surface of the panel supplied by the panel supply unit, wherein the peeling and attaching are conducted by an attachment unit; and
winding the release film peeled by the attachment unit, wherein the winding is conducted by a winding unit,
wherein the peeling and attaching includes:
peeling the polarizing film sheet piece from the release film through an adhering means, wherein the adhering means has an adhering property at an external side thereof, moving the adhering means to the attachment position, and making the polarizing film sheet piece face one surface of the panel in parallel;
pressing the adhering means through an attachment means to attach the polarizing film sheet piece to one surface of the panel, and
moving the adhering means through an adhering position, at which the adhering means adheres to the polarizing film sheet piece formed on the carried optical film, and the attachment position, and
wherein the adhering means is positioned on at least a part of a surface of the moving means.

10. The method of claim 9, wherein in the peeling and attaching, the moving means is formed in a belt type and is rotated, so that the adhering means circulates while passing through the adhering position and the attachment position.

11. The method of claim 9, wherein adhering force of the adhering means to the polarizing film sheet piece is larger than the adhering force between the adhesive layer of the polarizing film sheet piece and the release film and is smaller than the adhering force between the adhesive layer of the polarizing film sheet piece and the panel.

12. The method of claim 9, wherein in the peeling and attaching, the attachment means presses a rear portion of the polarizing film sheet piece in a direction adjacent to the panel to attach the rear portion of the polarizing film sheet piece to a rear portion of the panel, and moves forward to a front portion opposite to the rear portion of the polarizing film sheet piece to attach the polarizing film sheet piece to one surface of the panel.

13. The method of claim 9, wherein the attachment means includes an attachment roll, and
a diameter of the attachment roll is 20 to 80 mm.

14. The method of claim 9, further comprising:
aligning the panel to have a posture corresponding to a posture of the polarizing film sheet piece transferred to the attachment position, wherein the aligning is conducted by an aligning unit.

15. The method of claim 14, wherein the aligning includes:
photographing the polarizing film sheet piece and the panel transferred to the attachment position and providing an image;
calculating an alignment angle of the panel based on the image; and
adsorbing the panel and horizontally rotating or shifting the panel to be a state corresponding to the alignment angle.

16. The method of claim 15, wherein in the photographing, the polarizing film sheet piece transferred to the attachment position and the panel supplied to the attachment position are simultaneously photographed.

* * * * *